(12) United States Patent
Eberhardt

(10) Patent No.: US 11,132,355 B2
(45) Date of Patent: Sep. 28, 2021

(54) SYSTEMS AND METHODS FOR MONITORING EQUIPMENT

(71) Applicant: Christopher Eberhardt, Ben Lomond, CA (US)

(72) Inventor: Christopher Eberhardt, Ben Lomond, CA (US)

(73) Assignee: Time Lock Documentation LLC, San Jose, CA (US)

( * ) Notice: Subject to any disclaimer, the term of this patent is extended or adjusted under 35 U.S.C. 154(b) by 378 days.

(21) Appl. No.: 16/252,469

(22) Filed: Jan. 18, 2019

(65) Prior Publication Data

US 2020/0012634 A1 Jan. 9, 2020

Related U.S. Application Data

(63) Continuation-in-part of application No. 15/168,414, filed on May 31, 2016, now abandoned.

(51) Int. Cl.
| | | |
|---|---|---|
| G06F 16/23 | (2019.01) | |
| H04L 9/06 | (2006.01) | |
| H04L 9/32 | (2006.01) | |
| G01M 99/00 | (2011.01) | |
| G06F 21/60 | (2013.01) | |
| G01L 19/08 | (2006.01) | |

(52) U.S. Cl.
CPC ......... *G06F 16/2365* (2019.01); *G01M 99/00* (2013.01); *G06F 21/602* (2013.01); *H04L 9/06* (2013.01); *H04L 9/3297* (2013.01); *G01L 19/086* (2013.01); *H04L 2209/38* (2013.01)

(58) Field of Classification Search
CPC ..... G06F 16/2365; G06F 21/602; H04L 9/06; H04L 9/3297; H04L 2209/38
See application file for complete search history.

(56) References Cited

U.S. PATENT DOCUMENTS

| | | | | |
|---|---|---|---|---|
| 5,828,751 | A * | 10/1998 | Walker | H04L 63/08 713/175 |
| 8,631,161 | B2 * | 1/2014 | Lavrov | G06Q 10/063114 709/248 |
| 2004/0128613 | A1 * | 7/2004 | Sinisi | G06Q 10/00 715/203 |
| 2006/0087402 | A1 * | 4/2006 | Manning | G05B 19/41875 340/3.1 |
| 2008/0086415 | A1 * | 4/2008 | Bubrig | G06Q 20/102 705/40 |
| 2016/0283920 | A1 * | 9/2016 | Fisher | H04L 9/3297 |
| 2017/0206523 | A1 * | 7/2017 | Goeringer | G06Q 20/409 |
| 2017/0286880 | A1 * | 10/2017 | Wiig | G06Q 10/067 |
| 2019/0311443 | A1 * | 10/2019 | Blades | G01D 4/002 |
| 2020/0080873 | A1 * | 3/2020 | Jackson | G06Q 10/20 |

* cited by examiner

*Primary Examiner* — Nadja N Chong Cruz

(74) *Attorney, Agent, or Firm* — PowerPatent; Bao Tran

(57) ABSTRACT

Systems and methods are disclosed for certifying an equipment by connecting to a distributed ledger; capturing a physical location and a schematic location of the equipment; performing a test on the equipment; taking a picture of the equipment being tested; and certifying a test result and rendering the test results as immutable records on the distributed ledger.

19 Claims, 17 Drawing Sheets

Pressure Test Certification
Wed, 5/16/18 09:42 AM

Page 1 of 2

Date: Wednesday, May 16, 2018
Project: tech 9
Customer: Tanner Construction
Address: 1345 Oakland St. San Jose CA, 33647
Location: Mech Rm 408
Installer: B&G Mechanical
System Type: Refrigeration DX
Plan: P.267
Specification: 1500
Type: 2015 Uniform Mechanical Code

PASSED

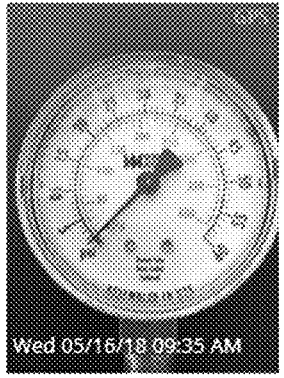

74 °F
Tempature Rising 2% .

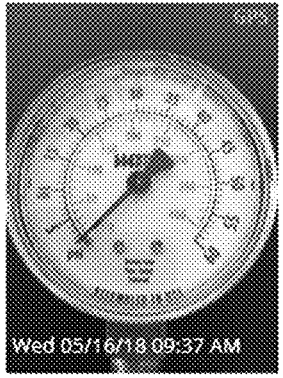

79 °F
Less rise then predicted.

Technician Tim Allen    Wednesday, May 16, 2018

City Inspecto Mike Smith    Wednesday, May 16, 2018

TLD

Pressure Test Certification
Wed, 5/16/18 09:42 AM

Page 2 of 2

Code Requirements:

SYSTEM - REFRIGERATION CONVENTIONAL DX (L-COPPER/BRAZED/R410A) P-TEST
CODE (SECTION) - BY CONTRACTOR/ 1116.4 DECLARATION
MEDIUM (air, water, inert gas) - NITROGEN
PRESSURE - 300 PSI / 20.6 bar
DURATION (TIME) - 24 HOURS

Comment:
Held pressure for 36 hours.

| |
|---|
| Associate the proof of work as a blockchain entry with: |
| a certified immutable text form; |
| a certification with an immutable date under the title embedded into the certification form; |
| a photo or video with an immutable note attached; |
| an initial photo or video with an immutable temperature reading attached; |
| an initial photo or video with an immutable time / date stamp embedded into the photo; |
| an initial photo or video with an immutable GPS stamp embedded into the photo; |
| an elapsed measurement of time captured and locked through this twelve step immutable block chain process; |
| a second corroborating photo or video with an immutable temperature reading attached; |
| a second corroborating photo or video with an immutable time / date stamp embedded into the photo; |
| a second corroborating photo or video with an immutable GPS stamp embedded into the photo; |
| a certification with an immutable e-signature embedded into the certification form; |
| a certification with an immutable corroborating e-signature embedded into the certification form. |

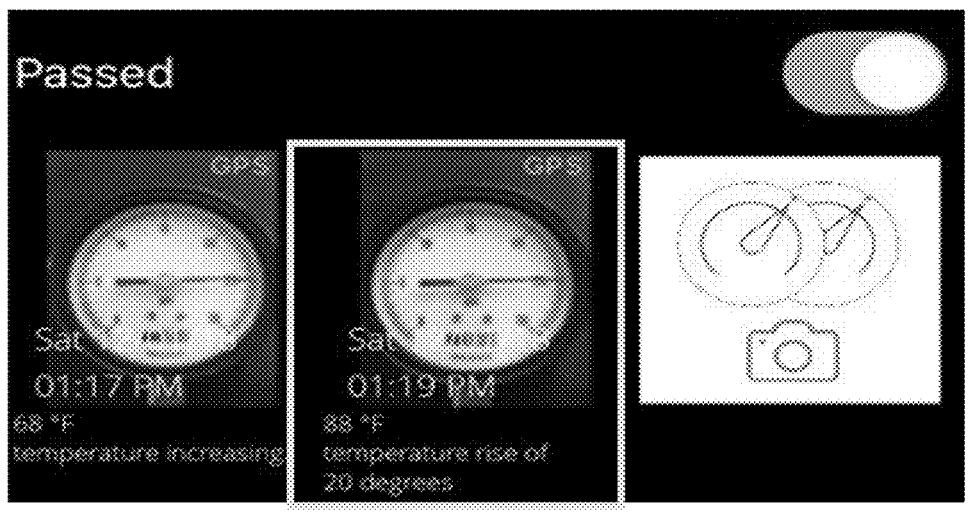

7) An elapsed measurement of time captured and locked through this fourteen-step immutable block chain process.
8) A second corroborating photo with an immutable temperature reading attached
9) A second corroborating photo with an immutable time / date stamp embedded into the photo.
10) A second corroborating photo with an immutable GPS stamp embedded into the photo.

11) A certification with an immutable e-signature embedded into the certification form.
12) A certification with an immutable corroborating e-signature embedded into the certification form.

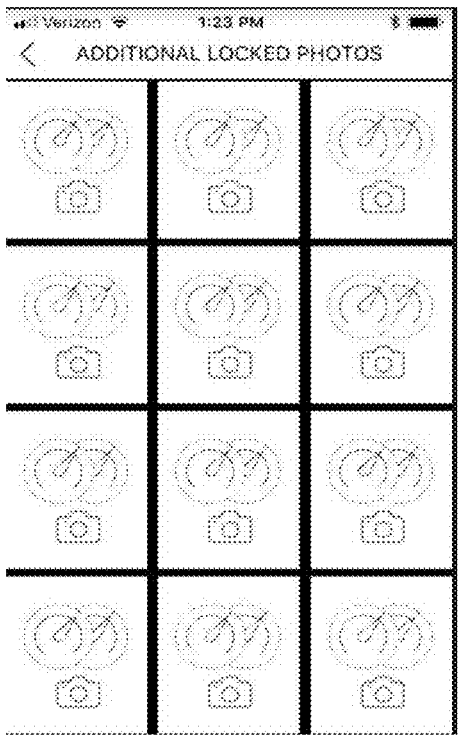

FIG. 9D

13) In addition, 16 more locked photo boxes, with time, Date, GPS and temp stamped are available to establish warranty, installation and equipment numbers.

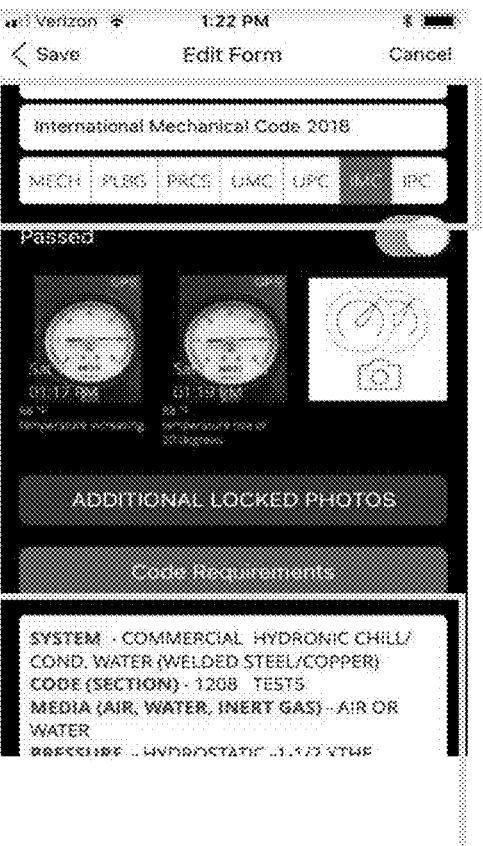

14) In addition, inspection information is automatically inserted into the document through a database consisting of City, County, State, country, provincial, manufacturer, International Association of Plumbing and Mechanical Officials (IAPMO), National Electrical Testing Agency(NETA), International Code Council (ICC), Society of Automotive Engineers (SAE), code information and can be configured to meet the users' needs depending on information (Inspection, code and specifications of equipment) loaded into the application program interface based on geographical location.

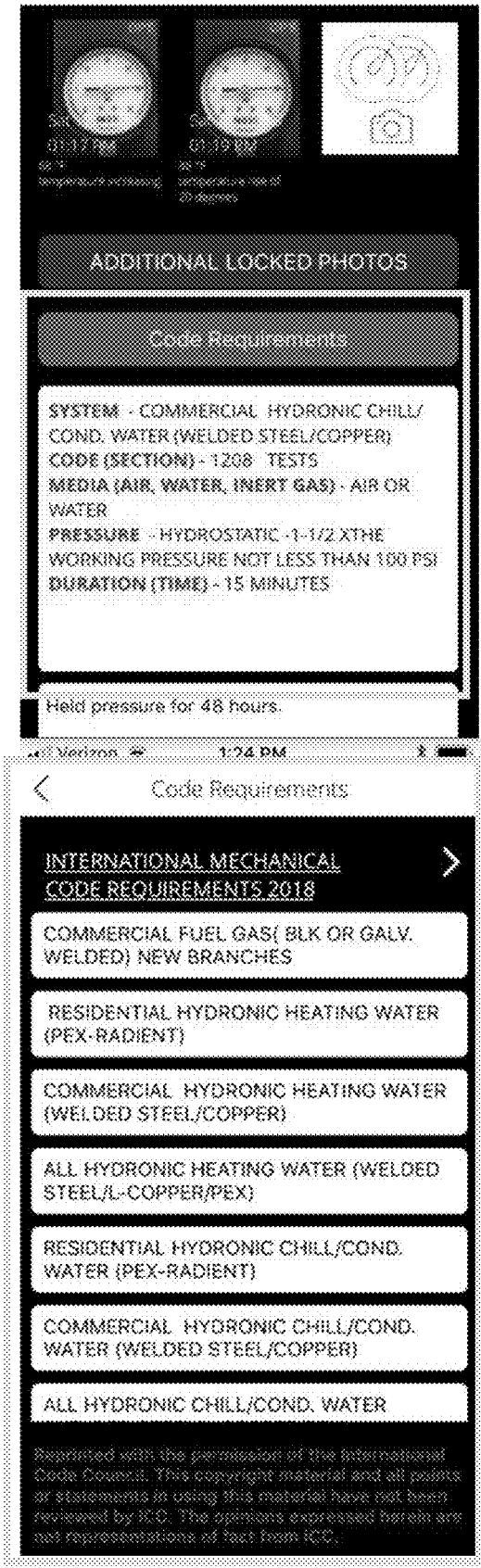

FIG. 9E

14) In addition, inspection information is automatically inserted into the document through a database consisting of City, County, State, country, provincial, manufacturer, International Association of Plumbing and Mechanical Officials (IAPMO), National Electrical Testing Agency(NETA), International Code Council (ICC), Society of Automotive Engineers (SAE), code information and can be configured to meet the users' needs depending on information (Inspection, code and specifications of equipment) loaded into the application program interface based on geographical location.

FIG. 9F

14) In addition, inspection information is automatically inserted into the document through a database consisting of City, County, State, country, provincial, manufacturer, International Association of Plumbing and Mechanical Officials (IAPMO), National Electrical Testing Agency(NETA), International Code Council (ICC), Society of Automotive Engineers (SAE), code information and can be configured to meet the users' needs depending on information (Inspection, code and specifications of equipment) loaded into the application program interface based on geographical location.

Pressure Test Certification
Sat, 12/01/18 01:27 PM

Page 1 of 2

| | |
|---|---|
| Date: | Saturday, December 1, 2018 |
| Project: | Sales Force Two |
| Customer: | Devcor Construction |
| Address: | 1654 East St. San Francisco CA, 44657 |
| Location: | Penthouse 455 |
| Installer: | AM Plumbing |
| System Type: | Condensing Water |
| Plan: | M.45 |
| Specification: | 1500 |
| Code: | International Mechanical Code 2018 |

PASSED

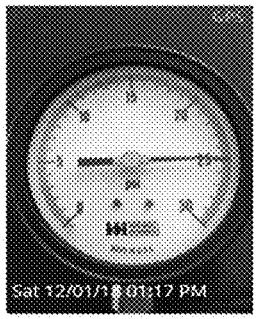
68 °F
temperature increasing.

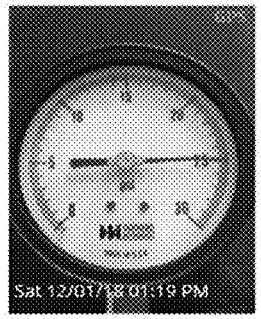
88 °F
temperature rise of 20 degrees.

Technician Tom Jones     Saturday, December 1, 2018

Inspector Mike Collins     Saturday, December 1, 2018

1). A certified immutable text form

FIG. 9G

Pressure Test Certification
Sat, 12/01/18 01:27 PM

Page 2 of 2
Code Requirements:
SYSTEM - REFRIGERATION DAIKIN REFNET (L-COPPER/BRAZED/ALUMINUM) P-TEST
CODE (SECTION) - MANUFACTURER / 1116.4 DECLARATION
MEDIUM (air, water, inert gas) - NITROGEN
PRESSURE - 550 PSI / 37.9 bar
DURATION (TIME) - 24 HOURS

Comment:
Held pressure for 48 hours.

1). A certified immutable text form

FIG. 9H

SYSTEMS AND METHODS FOR MONITORING EQUIPMENT

BACKGROUND

Work projects occurring at job sites, such as construction job sites, typically require frequent communication between job site personnel and off-site personnel located remote from the job site. These reports, however, are only as good as the diligence of the superintendent in keeping them accurate, detailed and up to date. Daily reports should be prepared as soon as practical after the day in question to assure accuracy and completeness. Copies should be maintained at the job site and at the main office and kept with the project files.

Regular if not daily photographs of the progress of work are as important as daily written reports. For any issue that arises, photographs and even video should be taken which clearly depict the issue involved. Photographs should be dated, logged and stored as part of the project file. When a dispute arises concerning a project issue, daily reports and photographs are the best records of events and can be vital to the prosecution or defense of a claim involving the contractor. The documentation requirements are used to show completion and correct functioning of contracted work.

Each shop tends to have their own protocols leading to non-standardized, error prone, insecure procedures for qualifying the correct functioning of a system. A typical scenario is ensuring an installed or repaired pressured system is leak free. The process for showing the system is working correctly most likely would involve an partially hand written single sheet with stapled photos of pressure gauges over a time span to show that pressure is steady within a system. Conventionally, this has been done using manual record keeping systems. However, general contractors and property owners prefer an electronic record keeping system—making it easier to capture information, generate reports and meet tax and legal reporting requirements.

Currently, the communications systems used by job site and off-site personnel include cellular telephones and facsimile machines. These communications systems lack the ability to conveniently store, update, and communicate the array of complex documents typically exchanged by job site and off-site personnel. Additionally, these communications systems lack the ability to clearly and conveniently communicate job site problems that need professional resolution, such as by an architect or engineer.

SUMMARY

Systems and methods are disclosed for certifying an equipment by capturing a physical location and a schematic location of the equipment; performing a test on the equipment; taking a picture of the equipment being tested; and certifying a test result; and sending the test result to a remote computer.

In one implementation, the system associates a blockchain entry with:

a certified immutable text form;

a certification with an immutable date under the title embedded into the certification form;

a photo or video with an immutable note attached;

an initial photo or video with an immutable temperature reading attached;

an initial photo or video with an immutable time/date stamp embedded into the photo;

an initial photo or video with an immutable GPS stamp embedded into the photo;

an elapsed measurement of time captured and locked through this twelve step immutable block chain process;

a second corroborating photo or video with an immutable temperature reading attached;

a second corroborating photo or video with an immutable time/date stamp embedded into the photo;

a second corroborating photo or video with an immutable GPS stamp embedded into the photo;

a certification with an immutable e-signature embedded into the certification form; and a certification with an immutable corroborating e-signature embedded into the certification form.

Advantages of the system may include one or more of the following. The Certification process for mechanical tests has become increasingly tedious given the high demand for services and increased complexity of pressurized systems. The system streamlines and provides a consistent format for field workers to utilize from inspection start to sign off. In addition to streamlining the documentation and sign off process, the Pressure Test Utility app can provide a certification by taking advantage of the smart phone sensors to improve accuracy like ambient temperature, GPS location, sorting and storing of documents, emailing, and signature capture (E-Sign).

BRIEF DESCRIPTION OF THE DRAWINGS

FIG. 2 shows an exemplary work edit form.

FIG. 5 shows an exemplary test certification report with media validation.

FIG. 7B shows a blockchain based process for certifying a gas gauge.

FIGS. 9A-9H show an exemplary blockchain monitoring system.

DESCRIPTION

Figure 1:
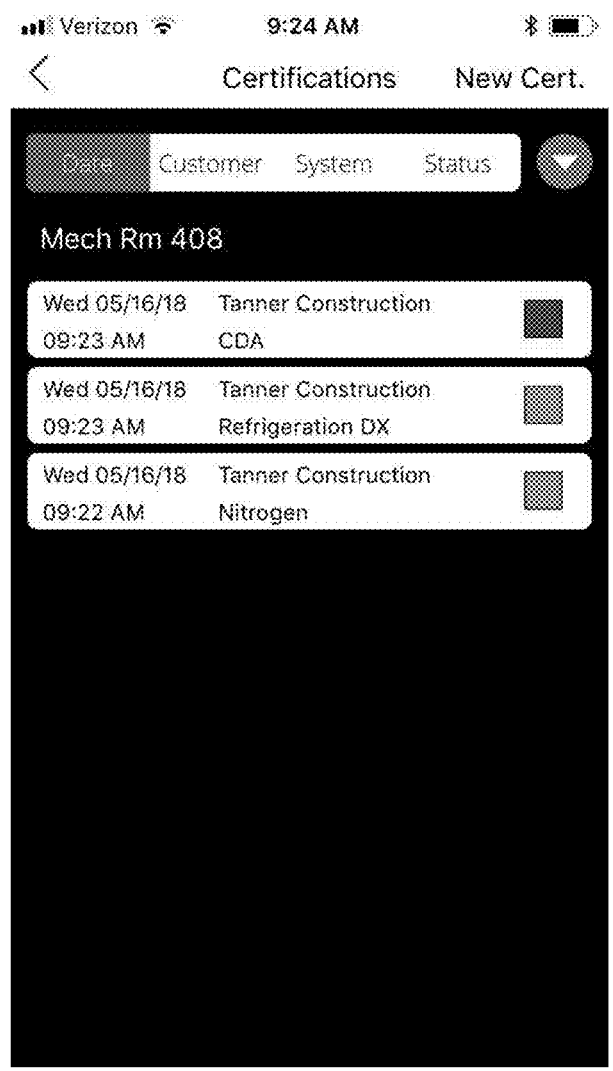
FIG. 1 shows an exemplary system management list.

FIG. 1 shows an exemplary system management list. The user interface shows a database style list of the jobs (or users) currently in progress or completed documents. Each list entry is identified by a customer name, system (project) and date. The selection list item offers the user choices such as: Edit, Delete, Delivery, among others.

Figure 2:
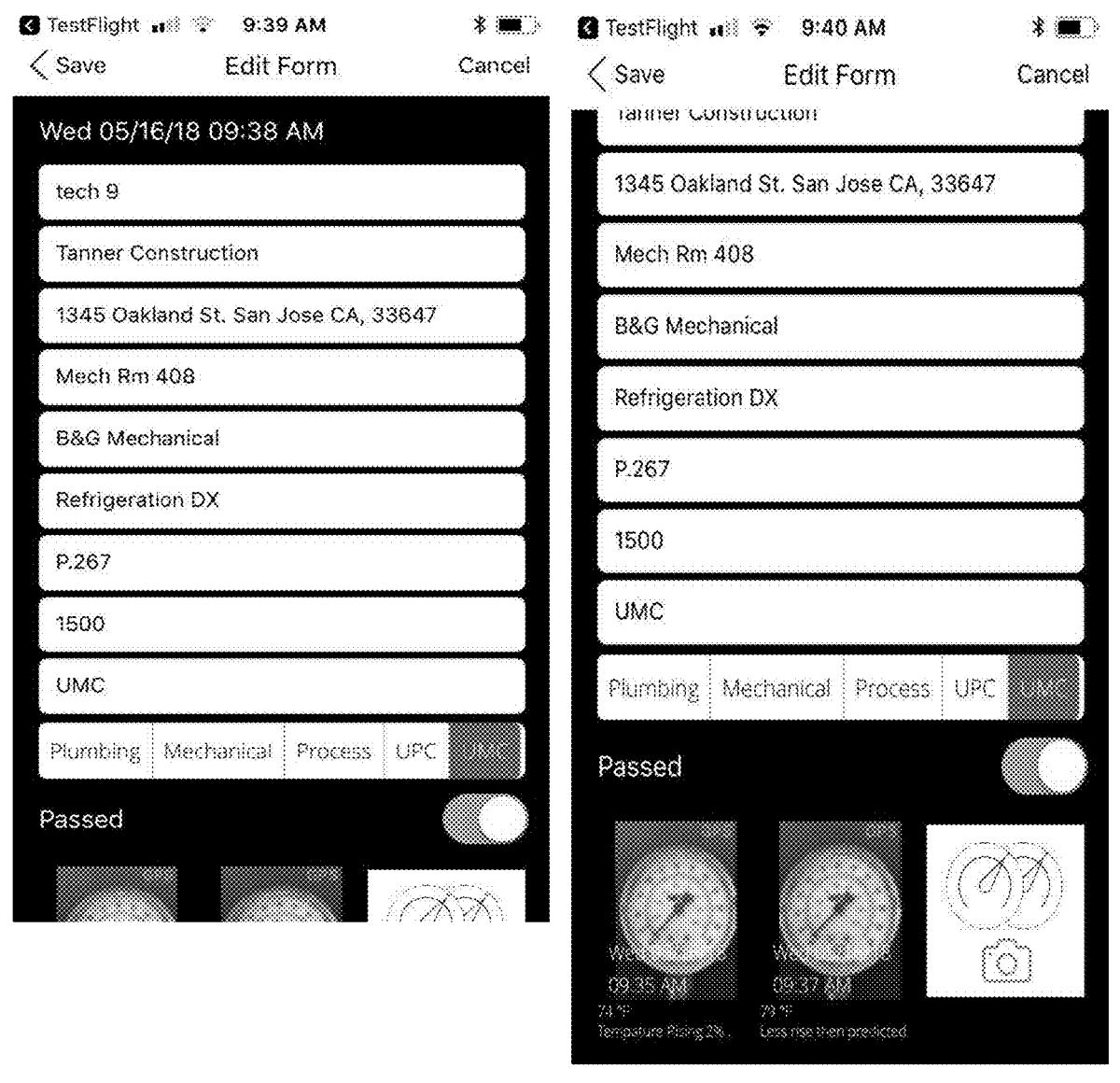

FIG. 2 shows an exemplary work edit form. This is a form style interface with input fields for the worker to edit. The system provides media capture fields. The user can attach a picture, video, or other media based on the nature of the problem such that shows the state of the system. For instance, in a pressurized system, the user would take image captures of the pressure gauge(s) spaced out over several days so as to prove the stability of the system.

Figure 3:
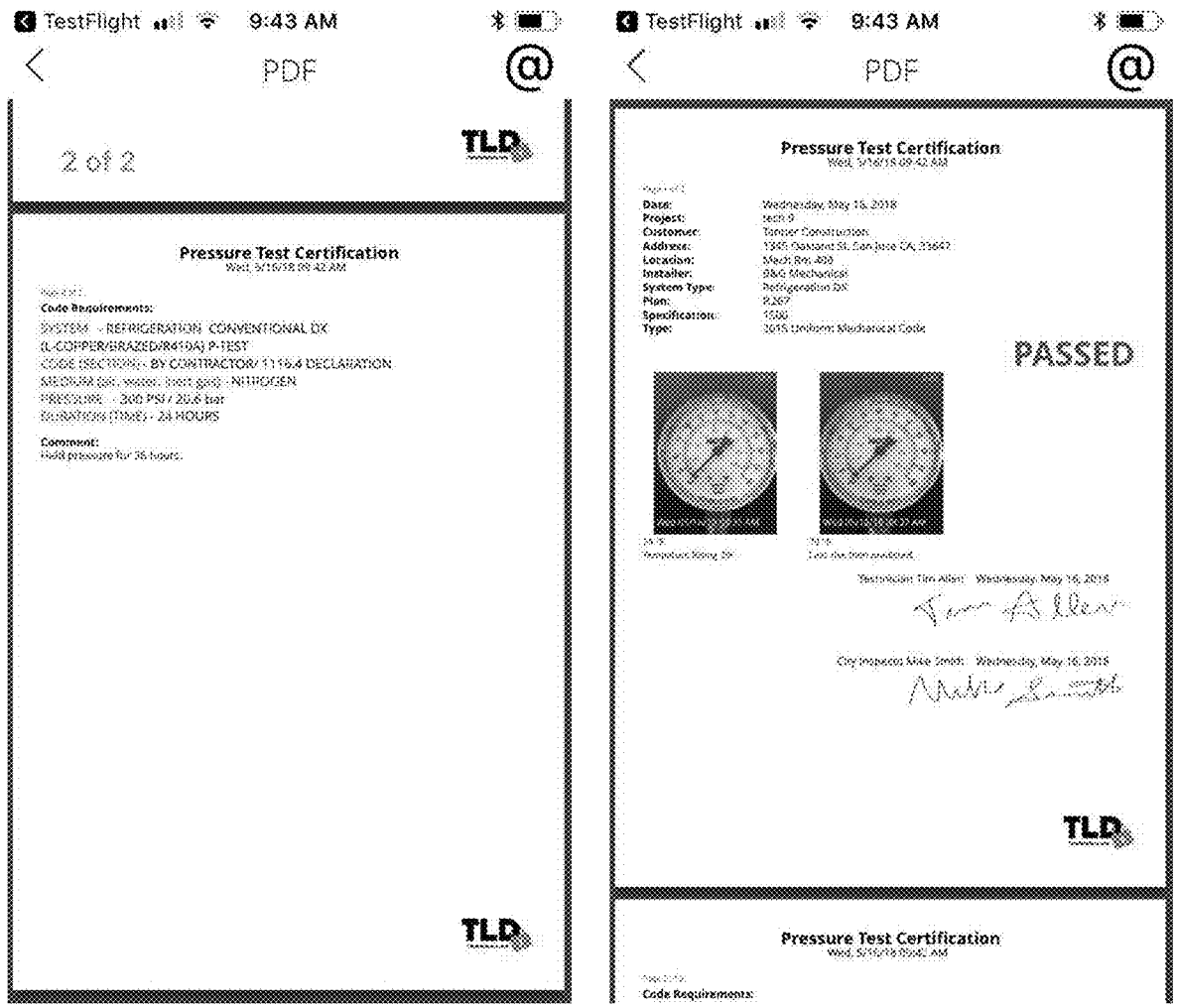
FIG. 3 shows an exemplary pressure test certification form.

FIG. 3 shows an exemplary pressure test certification form. From the Form edit screen, the user chooses a media slot to attach a media capture. The media capture must be live and cannot be an existing capture. This is to prevent error and misuse and gives the customer increased confidence. At the time of media capture, the application should also attach additional qualifying events. This can include, but is not limited to, time/date stamps, ambient temperature and GPS location. The additional data should be attached in such a way so that is cannot be modified, for instance, as a watermark on a photo. This is another method to reduce error, misuse or confusion.

Figure 4:
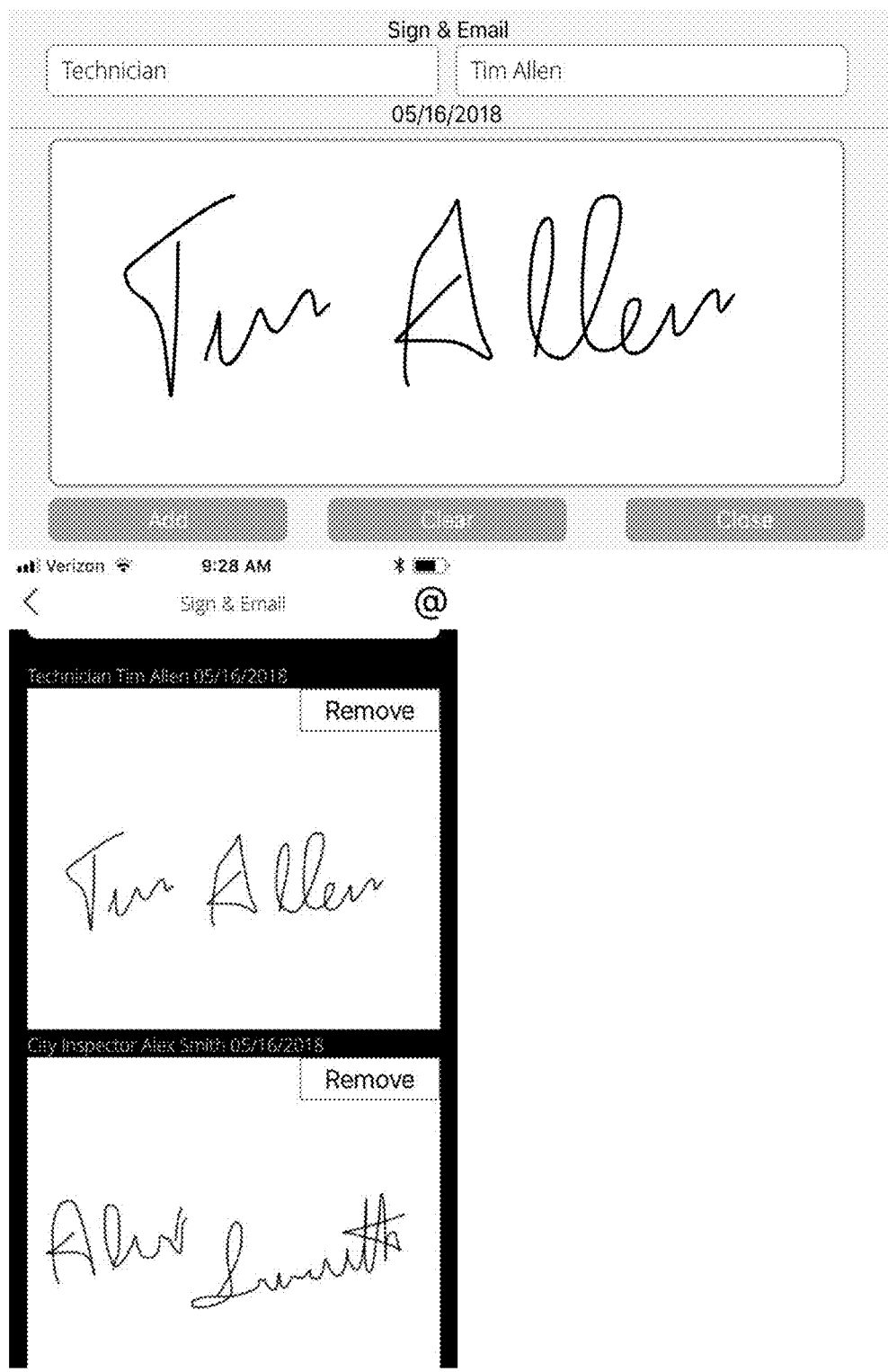
FIG. 4 shows an exemplary signature interface.

FIG. 4 shows an exemplary signature interface. This interface is modeled after an electronic signing pod one might encounter at the store. Users type their name into an editable field and then draw their signature on the screen using a stylus. Captured signatures are attached to the form submission screen and then discarded to prevent reuse.

FIG. 5 shows an exemplary test certification report with media validation. This is the report presented directly to the customer for evaluation. The screen should show all the same fields as were entered in the form edit screen along with all the medias. The interface does not allow for any editing of fields. There is however an option for electronic signing and email of the form should the customer be satisfied with the results.

Figure 6:
FIG. 6 shows an exemplary test certification report without media validation.

FIG. 6 shows an exemplary test certification report without media validation. This is a simplified version of FIG. 5. In one embodiment, after all parties are satisfied the final form can be emailed on the spot as an uneditable document. The uneditable document is typically in a format not editable with text editing software like JPEG image or image only PDF. The form fields are captured as images, paged if necessary so as to fit nicely on a 8.5×11" for print out.

Figure 7A:
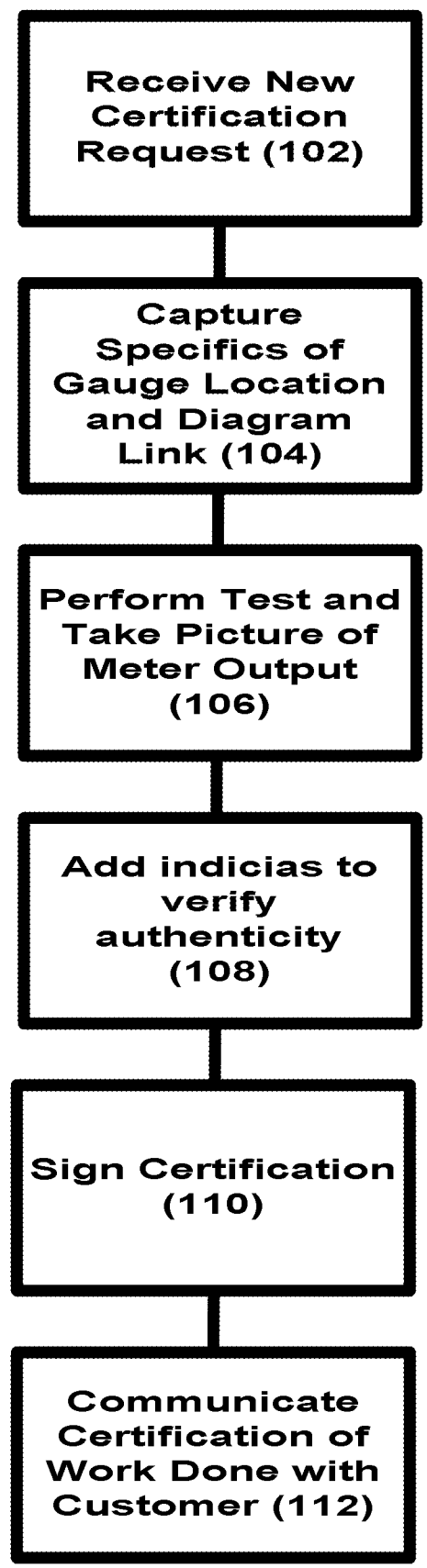
FIG. 7A shows an exemplary process for certifying a gas gauge.

FIG. 7A shows an exemplary process for certifying a gas gauge. The user initially is shown a dashboard with existing work (102). The user can add a new job, and enter the specifics of the gauge physical location as well as the location in the mechanical drawing section (104). The user can perform repair if the gas pipeline has an issue. Upon completion, the user can perform a pressure test with the result shown on the gauge, and capture the test result of the gauge as proof of the work (106). Optionally, the process can add indicias to verify authenticity (108) such as a timestamp of the work or encoding the picture so that it can not be edited or photoshopped. The entire output can also be encrypted to ensure authenticity (108). A human also signs the certification (110). The resulting work is communicated to a customer computer (112) to report completion and to bill the customer, for example. By emailing on the spot, and including all parties email addresses at the time of signing, the customer gains additional guarantee that certification is genuine.

The system can be used to monitor workflow report on test for equipment, including pressure gauges, meters, electrical panels, instrumentations, among others. The system thus provides an Enterprise Application designed by seasoned tradesmen for the professional mechanical/inspection service industries. The system includes the following:
- a single place to manage documentation of multiple systems.
- a way for workers to capture the state of systems directly into the final document.
- safeguards to minimize error and misuse.
- Electronic Signing directly through the application to eliminate the need for the time consuming print-sign-scan-email method.
- compatible with standard features of a smartphone, however it is not limited to smart phone devices.

One implementation offers the following:
- SQL backed list of Certification Forms. Standard SQL Can be exported and browsed by a wide range of professional software.
- Forms can be E-Signed right on the device and emailed out as an image JPEG or PDF that is easy to print out for hardcopy records.
- Multiple E-Sign-off enabled.
- Organize Mechanical Image Captures.
- Photos are date/time/ambient temperature stamped.
- 100% Documentation of Certification process form start to sign-off.
- This is a standalone application. No server side component and no Internet access is utilized by the app except indirectly via email and locations services for address look-ups.

FIG. 7B shows a blockchain based process for certifying a gas gauge. This embodiment uses a blockchain or a distributed ledger such as Ethereum. The blockchain is an incorruptible digital ledger of economic transactions that can be programmed to record not just financial transactions but virtually everything of value. Information held on a blockchain exists as a shared—and continually reconciled—database. This is a way of using the network that has obvious benefits. The blockchain database isn't stored in any single location, meaning the records it keeps are truly public and easily verifiable. No centralized version of this information exists for a hacker to corrupt. Hosted by millions of computers simultaneously, its data is accessible to anyone on the internet. Blockchain technology is like the internet in that it has a built-in robustness. By storing blocks of information that are identical across its network, the blockchain cannot be controlled by any single entity, and has no single point of failure.

In yet another embodiment, the measurement certification device need not generate its own time internally. Rather, the measurement certification device may include a receiver to obtain time from the timing signals provided by one or more Global Positioning System (GPS) satellites, or from radio signals from the US Naval Observatory atomic clock or any other reliable external source. Externally originating time is especially advantageous for deterring hacking of an internal clock. The receiver could either replace or supplement the clock. In addition, the clock could be used to double-check the received time (or vice-versa) by comparing the externally originating time against the internal clock time. The received time would be deemed accurate if the two times agreed to within the cumulative inaccuracies of the received signal (external time source inaccuracy plus any uncorrected transmission delay) and the internal clock. Finally, the cryptoprocessor could be programmed to receive the signal encrypted in the time transmitter's private key, or in the receiver's public key, as an extra measure of assurance that an impostor has not substituted an incorrect time for that of the broadcast source.

Certain of the external timing signals (e.g., GPS) may also be used to determine location information, which can be incorporated into the certified measurement as the primary physical parameter. In such a case, the external signal receiver itself would serve as the physical measurement sensor. Alternatively, the device could include a physical measurement sensor distinct from the external signal receiver. In that case, the sensor would provide the physical measurement, and the external signal receiver would provide either time and/or location information for inclusion with the certified physical measurement. Location certification finds application in devices to limit vehicle operation to a prescribed area, verify routes traveled, enforce house arrest, and numerous other monitoring and signaling applications.

The physical parameter could be any physical quantity measurable by a sensor and representable in digital form, including location data, biometric data, temperature, humidity, light levels, noise levels, precipitation, pressure, momentum, odor, air pollution, car exhaust, water purity, weight, orientation, acidity, proximity, opacity, radioactivity, viscosity, chemical content, and any other physical parameter whose value and time of measurement is to be certified to a recipient for later verification.

The degree of cryptographic processing depends on the degree of security that is desired. For example, where the primary concern is integrity, a simple one-way algorithm, e.g. a hash, message authenticity code (MAC), or cyclic redundancy check (CRC), might be adequate. Where the measurement certification device is used to certify a sequence of measurements on a frequent basis, a chain of hashes—where each certified measurement also includes representations of one or more previous measurements—provides an additional degree of measurement integrity. In other cases, the measurement certification device might sign the time with a device-specific private key, to provide authenticity in addition to integrity. Even greater assurance can be provided by adding unique device IDs, challenge-response protocols, digital certificates, combinations of symmetric and asymmetric (public key) encryption, and many other cryptographic techniques, in patterns appropriate to the particular application at hand.

The certified measurement may be outputted in a variety of formats, for example, as a physical stamp or an electromagnetic signal. In the former case, the device could include handheld printers, facsimile machines, computer printers, copiers, or any other document production device. In the latter case, the signal could be: 1) recorded to magnetic, optical, or semiconductor media, 2) sent to a display for viewing. Finally, instead of a local output device, the certified measurement could be transmitted (over wireless or physical networks) to a remote site for printing, recording or display thereat.

Furthermore, the certified measurement may be outputted at a variety of frequencies, for example: 1) at predetermined times, 2) upon request of either the user or the recipient, 3) upon presentation of a request encrypted in a public key corresponding to the private key of the measurement certification device, 4) upon production of data by the output device, or 5) under control of a broadcast signal. Requests for measurement certification would be received by an input device which generates a certified measurement request to direct the cryptographic processor to form the certified measurement. The input device need not be a separate element, but could comprise the sensor, the external signal receiver, or any other device capable of detecting a triggering event to order the certified measurement request.

As one specific example of the many possible output formats and frequencies, a transmitter could be included in the measurement certification device for transmitting a location measurement to a remote receiver on a periodic basis. Conversely, if the measurement is transmitted in response to an abnormal event detected by a sensor, the certified measurement could serve as an automated distress signal. For certain applications, the measurement certification device could even be connected to an automatic disconnect or "dead man's switch" to automatically disable dangerous equipment until assistance arrives.

In general, a recipient of the certified measurement can determine its authenticity and/or integrity by performing cryptographic operations on the cleartext and/or ciphertext parts of the certified measurement. For example, in the case of a hashed measurement, the recipient can verify the measurement by recomputing the hash and comparing it with the received hash (the ciphertext part of the certified measurement). The hash could even be a keyed operation to provide greater security. Or, if the measurement was encrypted with the device private key, the recipient can use the corresponding device public key to decrypt and verify the measurement. The public key could either be obtained from a public database or distributed using digital certificates within the certified measurement. Alternatively, instead of public/private key pairs, the measurement certification device could use a symmetric key—either alone or in combination with public key cryptography.

The measurement may include additional features to increase confidence therein. For example, the measurement could include a unique device ID to identify itself to a measurement recipient. Furthermore, the measurement certification device could prevent re-use of a previous measurement by using a challenge-response protocol in which the requester transmits a random number to the device for inclusion in the measurement. Alternatively, the device could include a random number generator for local generation of the random number. Those skilled in the art will appreciate that the challenge can use any datum whose value is unpredictable by the recipient; random numbers happen to be a particularly convenient choice.

Finally, the device may include a signal generator for providing a corroborative datum, indicative of an operational condition of the device, to be included in the certified measurement. The corroborative datum could be any quantity that independently attests to the acquisition of the physical measurement. For example, the device could include an internal state detector providing a "normal operation" signal as long as the device's security measures were intact and functional. Conversely, an external state detector could provide a normal operation signal indicating that the device was being operated within a prescribed range of environmental conditions. Alternatively, the external state detector could be a secondary sensor providing a measurement corroborative of the primary sensor measurement being certified (e.g., a temperature detector in addition to a smoke detector for a certified fire alarm application). Still other possibilities include human witnessing of the physical measurement, either through keypads or memory readers for witnesses to input their witness identifiers. Alternatively, biometric measures could be used for positive witness identification.

Figure 8:
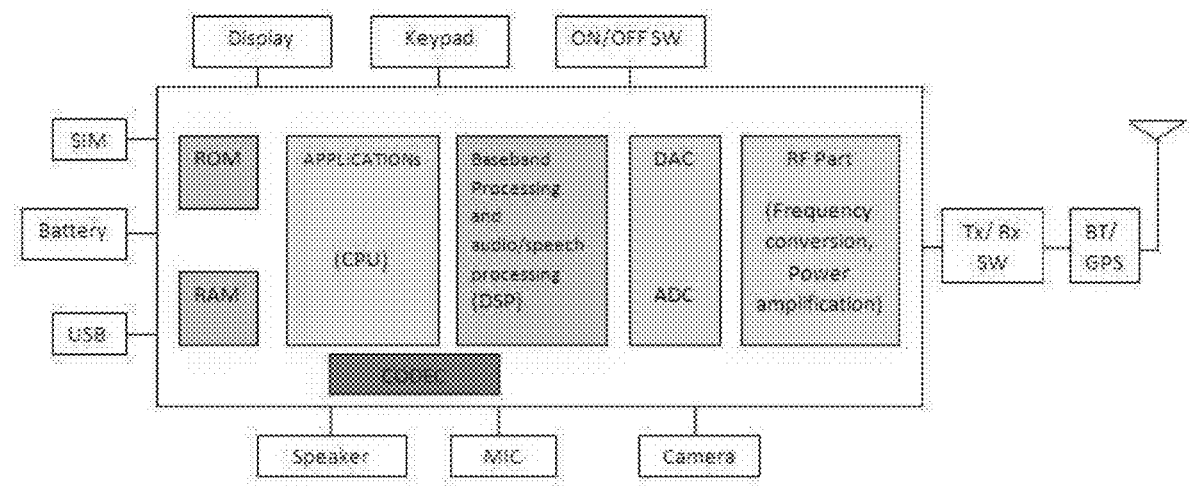
FIG. 8 shows an exemplary mobile device to certify a gas gauge.
Figure 9A:
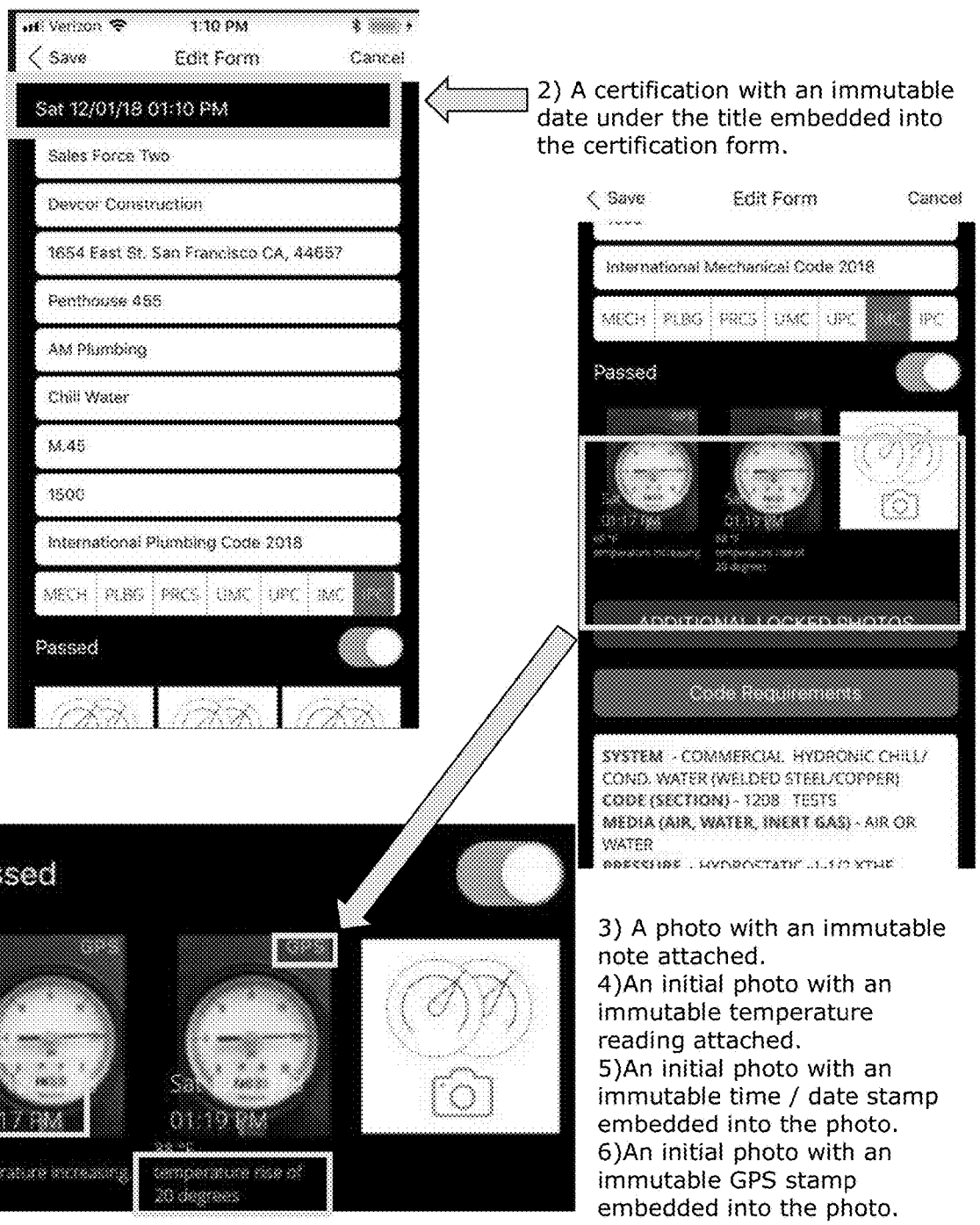
Figure 9C:
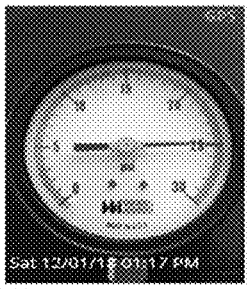

FIG. 8 shows an exemplary mobile device block diagram. The device includes an RF part which consists of RF frequency up converter and RF frequency down converter. The RF communicates with an antenna. Commonly used antennas in the mobile phone are of various types such as helix type, planar inverted F type, whip or patch type. As there is only one antenna used for both transmit and receive at different times, Tx/Rx Switch is used to connect both Tx path and Rx path with antenna at different times. Tx/Rx Switch is controlled automatically by DSP based on GSM frame structure with respect to the physical slot allocated for that particular GSM mobile phone in both downlink and uplink. For FDD systems diplexer is used in place of switch which acts as filter to separate various frequency bands. To know RF switch basics and manufacturers read page on RF switch in terminology section.

The Baseband part basically converts voice/data to be carried over GSM air interface to I/Q baseband signal. This is the core part which changes modem to modem for various air interface standards viz.CDMA, Wimax, LTE, HSPA and more. It is often named as physical layer or Layer 1 or L1. It is ported usually on DSP (Digital Signal Processor) to meet latency and power requirements of mobile phone. For Speech/audio, codec is used to compress and decompress the signal to match the data rate to the frame it has to fit in. CODEC converts speech at 8 KHz sampling rate to 13 kbps rate for full rate speech traffic channel. To do this RELP (Residually Excited Linear Predictive coder) speech coder is used which packs 260 bits in 20 ms duration to achieve 13 kbps rate. The baseband or physical layer will add redundant bits to enable error detection as well as error correction. Error detection is obtained with CRC and error correction with forward error correction techniques such as convolutional encoder (used at transmit part) and viterbi decoder (used at receive part). Other than this interleaving is done for the data of one burst which helps in spreading the error over the time hence helps receiver de-interleave and decode the frame (consecutively data burst) correctly. For more refer our page on GSM Physical Layer.

The ADC (Analog to Digital Converter) and DAC (Digital to Analog Converter) is used to convert analog speech signal to digital signal and vice versa in the mobile handset. At Transmit path, ADC converted digital signal is given to speech coder. There are various ADCs available, among them popular one is sigma delta type. AGC (Automatic Gain Control) and AFC (Automatic Frequency Control) is used in the receiver path to control gain and frequency. AGC helps maintain working of DAC satisfactorily, as it keeps signal within the dynamic range of DAC.AFC keeps frequency error within limit to achieve better receiver performance.

To make data transfer fast enough between mobile phone and other computing devices (laptop, desktop, tablet) or between mobile and mobile various technologies are evolved which include WLAN, Bluetooth, USB. The GPS (global positioning system) is used for location assistance and will enable google map to work efficiently. The microphone or mic converts air pressure variations (result of our speech) to electrical signal to couple on the PCB for further processing. Usually in mobile phone mic of types condenser, dynamic, carbon or ribbon is used. The speaker converts electrical signal to audible signal (pressure vibrations) for human being to hear. This is often coupled with audio amplifier to get required amplification of audio signal. It also tied with volume control circuit to change (increase or decrease) the amplitude of the audio signal. Various mega pixel camera for mobile phones are available such as 12 mega pixel, 14 mega pixel and even 41 mega pixel available in smartphones. There are various display devices used in mobile phone such as LCD (liquid crystal display), TFT (Thin-film transistor) screen, OLED (organic light emitting diode), TFD (thin film diode), touch screen of capacitive and resistive type etc.

The device can have a keypad. In earlier days keypad was simple matrix type keypad which contains numeric digits (0 to 9), alphabets (a to z), special characters and specific function keys. These has been designed for various applications such as accepting call, rejecting call, cursor movement (left, right, top, down) dialing number, typing name/sms/mms and so on. Now-a-days keypad has been removed from the phone design and it has become part of mobile phone software. It pops on the display screen itself which can be operated by user using touch of a finger tip.

FIGS. 9A-9H show an exemplary blockchain monitoring system. One embodiment for Time Locked Certification applies a twelve operation immutable block chain process as follows:

1) A certified immutable text form.
2) A certification with an immutable date under the title embedded into the certification form.
3) A photo or video with an immutable note attached.
4) An initial photo or video with an immutable temperature reading attached.
5) An initial photo or video with an immutable time/date stamp embedded into the photo.
6) An initial photo or video with an immutable GPS stamp embedded into the photo.
7) An elapsed measurement of time captured and locked through this twelve step immutable block chain process.
8) A second corroborating photo or video with an immutable temperature reading attached.
9) A second corroborating photo or video with an immutable time/date stamp embedded into the photo.
10) A second corroborating photo or video with an immutable GPS stamp embedded into the photo.
11) A certification with an immutable e-signature embedded into the certification form.
12) A certification with an immutable corroborating e-signature embedded into the certification form.

The process produces a certified pin point in time and elapsed time of a gauge or device reading that is non tamperable internally or externally through this twelve step immutable block chain process creating a time locked certification.

In another embodiment, in addition to the above 12 steps, two additional operations can be done:

13) In addition, 16 more locked photo boxes, with time, Date, GPS and temp stamped are available to establish warranty, installation and equipment numbers.
14) In addition, inspection information is automatically inserted into the document through a database consisting of City, County, State, country, provincial, manufacturer, International Association of Plumbing and Mechanical Officials (IAPMO), National Electrical Testing Agency (NETA), International Code Council (ICC), Society of Automotive Engineers (SAE), code information and can be configured to meet the users' needs depending on information (Inspection, code and specifications of equipment) loaded into the application program interface based on geographical location.

One embodiment works with Ethereum which is a platform that allows people to easily write decentralized applications (Dapps) using blockchain technology. A decentralized application is an application which serves some specific purpose to its users, but which has the important property that the application itself does not depend on any specific party existing. The Ethereum blockchain can be alternately described as a blockchain with a built-in programming language, or as a consensus-based globally executed virtual machine. The part of the protocol that actually handles internal state and computation is referred to as the Ethereum Virtual Machine (EVM). From a practical standpoint, the EVM can be thought of as a large decentralized computer containing millions of objects, called "accounts", which have the ability to maintain an internal database, execute code and talk to each other. The Ethereum blockchain (or "ledger") is a decentralized, massively replicated database in which the current state of all accounts is stored. The blockchain uses a database called a Patricia tree (or "trie") to store all accounts; this is essentially a specialized kind of Merkle tree that acts as a generic key/value store. Like a standard Merkle tree, a Patricia tree has a "root hash" that can be used to refer to the entire tree, and the contents of the tree cannot be modified without changing the root hash. For each account, the tree stores a 4-tuple containing [account_nonce, ether_balance, code_hash, storage_root], where account_nonce is the number of transactions sent from the account (kept to prevent replay attacks), ether_balance is the balance of the account, code_hash the hash of the code if the account is a contract and " " otherwise, and storage_root is the root of yet another Patricia tree which stores the storage data. Unlike Bitcoin, Ethereum blocks contain a copy of both the transaction list and the most recent state. Aside from that, two other values, the block number and the difficulty, are also stored in the block. The basic block validation and insertion of the equipment certification is as follows:

Check if the previous block referenced exists and is valid for equipment certification.

Check that the timestamp of the block is greater than that of the referenced previous block and less than a predetermined time into the future Check that the block number, difficulty, transaction root, uncle root and gas limit (and other low-level Ethereum-specific concepts) are valid.

Check that the proof of work on the block is valid.

Let S[0] be the state at the end of the previous block.

Let TX be the block's transaction list, with n transactions. For all i in 0 . . . n−1, set S[i+1]=APPLY (S[i], TX[i]). If any application returns an error, or if the total gas consumed in the block up until this point exceeds the GASLIMIT, return an error.

Let S_FINAL be S[n], but adding the block reward paid to the miner.

Check if the Merkle tree root of the state S_FINAL is equal to the final state root provided in the block header. If it is, the block is valid; otherwise, it is not valid.

Store the latest equipment certification on the blockchain.

The above examples illustrate several of many possible mobile uses of measurement certification devices in connection with location certification. Of course, the physical parameter being measured need not be restricted to location, but could include any physical quantity capable of being transduced into a digital signal by a secure sensor. Location certification simply happens to be a natural application of mobile measurement certification devices.

Conversely, a stationary measurement certification device could be used to track a mobile physical event. For example, an array of smog sensing devices could be used to track pollutant dispersion for air quality studies. These and many other different combinations of measurement certification and location certification will be known to those skilled in the art.

For purposes of illustration only, and not to limit generality, the present invention has been explained with reference to various examples of time sources, cryptographic operations, output devices, and sensors. However, one skilled in the art will appreciate that the invention is not limited to the particular illustrated embodiments or applications, but includes many others that operate in accordance with the principles disclosed herein.

What is claimed is:

1. A method for certifying an equipment, comprising:
    capturing, by a camera, a physical location and a schematic location of the equipment;
    performing a pipe pressure test on the equipment;
    taking, by the camera, a plurality of pictures or videos of the equipment being tested including a picture of a pressure measurement;
    certifying, by a computing device, a test result with a human signature and a computer signature and rendering an entry with the physical location of the equipment, the picture of the equipment being tested including a picture of a pressure measurement, and pressure test results as immutable records on a distributed ledger;
    connecting, by the computing device, to a distributed ledger and associating a blockchain entry with:
        a certified immutable text form;
        a certification with an immutable date under a title embedded into a certification form;
        a photo or video with an immutable note attached;
        an initial photo or video with an immutable temperature reading attached;
        an initial photo or video with an immutable time/date stamp embedded into the photo;
        an initial photo or video with an immutable GPS stamp embedded into the photo;
        an elapsed measurement of time captured and locked on a immutable block chain;
        a second corroborating photo or video with an immutable temperature reading attached;
        a second corroborating photo or video with an immutable time/date stamp embedded into the photo;
        a second corroborating photo or video with an immutable GPS stamp embedded into the photo;
        a certification with an immutable e-signature embedded into the certification form; and
        a certification with an immutable corroborating e-signature embedded into the certification form; and
        displaying the certification for verification of work.

2. The method of claim 1, wherein the equipment comprises gauge, meter, electrical panel, and/or instrument.

3. The method of claim 1, comprising capturing a time when the equipment is tested.

4. The method of claim 1, comprising encoding the test result to prevent tampering.

5. The method of claim 1, comprising encrypting the test result with one-way function associated with a cryptographic key.

6. The method of claim 5, wherein the one-way function includes a representation of the time and/or a non-time datum.

7. The method of claim 5, wherein the one-way function comprises a previously produced certifiable measurement.

8. The method of claim 1, comprising sending an invoice with the test result.

9. The method of claim 1, comprising taking the picture using a tablet or mobile phone, encoding the picture with a time stamp, signing the certification using a finger, and transmitting the test result over a cellular channel or WiFi channel.

10. A device for secure measurement acquisition and reporting on work on a system with a meter or gauge, comprising
    a camera to capture and image or video of the meter or gauge;
    a time generator for transmitting a representation of time;
    a touch sensitive surface to capture a user signature;
    a computing device, including a computer processor and a memory, coupled to the camera to capture a measurement signal representative of a physical measurement from the gauge or meter including a picture of a pressure measurement and the representation of the time from the time generator;

code to generate a certifiable measurement with a human signature and a computer signature in response to a request for the certifiable measurement and connect to a blockchain associate a blockchain entry to immutable record the certifiable measurement with:

a certified immutable text form;

a certification with an immutable date under a title embedded into a certification form;

a photo or video with an immutable note attached;

an initial photo or video with an immutable temperature reading attached;

an initial photo or video with an immutable time/date stamp embedded into the photo;

an initial photo or video with an immutable GPS stamp embedded into the photo;

an elapsed measurement of time captured and locked on a immutable block chain;

a second corroborating photo or video with an immutable temperature reading attached;

a second corroborating photo or video with an immutable time/date stamp embedded into the photo;

a second corroborating photo or video with an immutable GPS stamp embedded into the photo;

a certification with an immutable e-signature embedded into the certification form; and a certification with an immutable corroborating e-signature embedded into the certification form;

and an image of a human signature; and displaying, by the device, the certification for verification of work.

11. The device of claim 10, wherein the time generator includes a clock.

12. The device of claim 10, comprising a cryptographic module with a one-way function.

13. The device of claim 12, wherein the one-way function is associated with a cryptographic key.

14. The device of claim 12, wherein the one-way function includes a representation of the time.

15. The device of claim 12, wherein the one-way function includes a representation of the time.

16. The device of claim 12, wherein the one-way function of comprises a previously produced certifiable measurement.

17. The device of claim 10, comprising a cryptographic module for encryption with an encryption key.

18. The device of claim 17, wherein the encryption incorporates a representation of a previously produced certifiable measurement.

19. The device of claim 17, wherein the encryption key belongs to an asymmetric cryptographic protocol.

* * * * *